(12) United States Patent
Dewald et al.

(10) Patent No.: US 9,296,328 B1
(45) Date of Patent: Mar. 29, 2016

(54) MOVABLE STRAP SECUREMENT SYSTEM

(71) Applicants: Landon Jerome Dewald, Fargo, ND (US); Kenneth Valentine Axtman, Fargo, ND (US)

(72) Inventors: Landon Jerome Dewald, Fargo, ND (US); Kenneth Valentine Axtman, Fargo, ND (US)

( * ) Notice: Subject to any disclaimer, the term of this patent is extended or adjusted under 35 U.S.C. 154(b) by 6 days.

(21) Appl. No.: 14/219,320

(22) Filed: Mar. 19, 2014

(51) Int. Cl.
 *B60P 7/08* (2006.01)
(52) U.S. Cl.
 CPC .............. *B60P 7/0815* (2013.01); *B60P 7/0807* (2013.01)
(58) Field of Classification Search
 CPC ............................. B60P 7/0815; B60P 7/0807
 USPC ............. 410/50, 97, 100, 103, 104, 106, 110, 410/116
 See application file for complete search history.

(56) References Cited

U.S. PATENT DOCUMENTS 3,910,558 A * 10/1975 Brucker et al. ............... 410/103
2006/0153658 A1* 7/2006 Watson et al. ................ 410/106

* cited by examiner

*Primary Examiner* — Stephen Gordon
(74) *Attorney, Agent, or Firm* — Dave Alan Lingbeck

(57) ABSTRACT

A movable strap securement system for moving and positioning the strap securement member as needed. The movable strap securement system includes a bracket adapted to be movable along a transport and having a strap securement member for securing a hook attached to an end of a strap and also includes a rail adapted to extend along a side of the transport and having a top wall and flanges extending along and depending from opposed side edges of the top wall to form a channel between the top wall and the flanges with the bracket slidably received in the channel and supported by the rail with the flanges received in the slots to support the bracket.

3 Claims, 4 Drawing Sheets

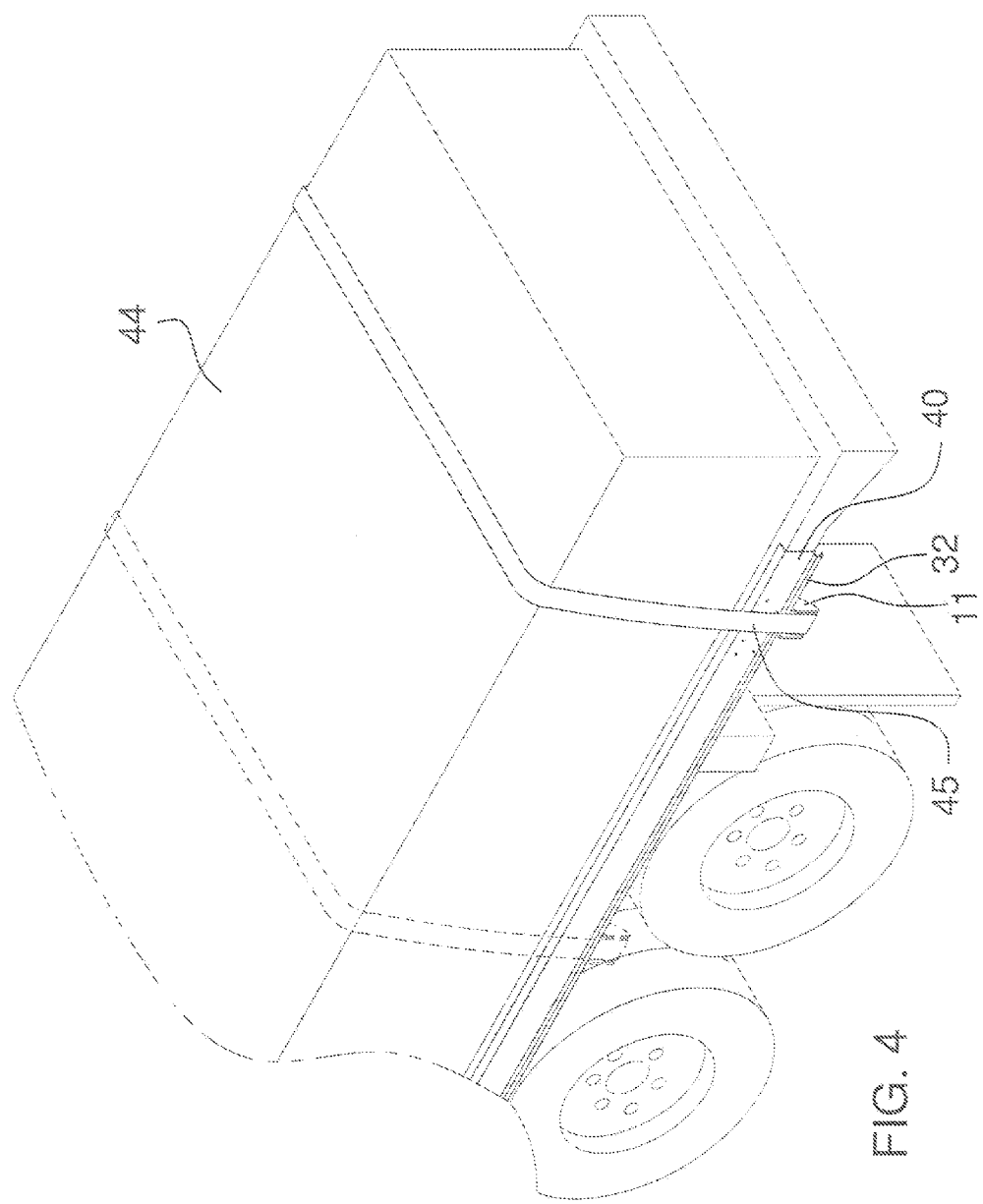

MOVABLE STRAP SECUREMENT SYSTEM

BACKGROUND OF THE INVENTION

1. Field of the Invention

The present invention relates to tie down systems and more particularly pertains to a new movable strap securement system for moving and positioning the strap securement member as needed.

2. Description of the Prior Art

The use of tie down systems are known in the prior art. More specifically, tie down systems heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a hook hanger for a cargo trailer having a body defining a mounting bracket conforming in shape to and slidably engageable with an associated sliding winch track of an associated cargo trailer; a hook anchor connected to the mounting bracket; and a wall that cooperates with the hook anchor to define a channel between the wall and the hook anchor. The channel opens in a side of the body, and the wall limits vertical movement of an associated hook connected to the hook anchor to prevent inadvertent disengagement by vertical movement of the associated hook from the hook anchor. The associated hook is disengageable from the hook anchor only by sliding movement in the channel in a direction transverse to vertical. A retaining member is optionally connected to the body and movable to a locked position where it captures the associated hook in the channel. Another prior art includes A restraining strap securement system for a trailer includes a load-restraining strap with a flat hook that connects to the trailer side rail. The trailer side rail extends along the sides of the trailer and comprises a bottom wall with an opening for receiving the flat hook.

A keeper slides upon a rail affixed to the bottom wall and the keeper may be positioned to extend beneath the flat hook and prevent the flat hook from falling from the opening while the strap is being tightened. The keeper may comprise a hook that can be used to secure tarps or ropes over the trailer load. While these devices fulfill their respective, particular objectives and requirements, the aforementioned patents do not disclose a new movable strap securement system.

SUMMARY OF THE INVENTION

The general purpose of the present invention, which will be described subsequently in greater detail, is to provide a new movable strap securement system which has many of the advantages of the tie down systems mentioned heretofore and many novel features that result in a new movable strap securement system which is not anticipated, rendered obvious, suggested, or even implied by any of the prior art tie down systems, either alone or in any combination thereof. The present invention includes a bracket adapted to be movable along a transport and having a strap securement member for securing a hook attached to an end of a strap and also includes a rail adapted to extend along a side of the transport and having a top wall and flanges extending along and depending from opposed side edges of the top wall to form a channel between the top wall and the flanges with the bracket slidably received in the channel and supported by the rail with the flanges received in the slots to support the bracket. None of the prior art includes the combination of the elements of the present invention.

There has thus been outlined, rather broadly, the more important features of the movable strap securement system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new movable strap securement system which has many of the advantages of the tie down systems mentioned heretofore and many novel features that result in a new movable strap securement system which is not anticipated, rendered obvious, suggested, or even implied by any of the prior art tie down systems, either alone or in any, combination thereof.

Still another object of the present invention is to provide a new movable strap securement system for moving and positioning the bracket as needed.

Still yet another object of the present invention is to provide a new movable strap securement system that accommodates all types of loads and to ensure that the loads are safely secured on the trailer.

Even still another object of the present invention is to provide a new movable strap securement system that instead of having to reposition the load upon the trailer, the bracket can be easily and conveniently repositioned as needed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a perspective view of a partial trailer with the bracket system in use.

DETAILED DESCRIPTION OF THE INVENTION

Figure 1:
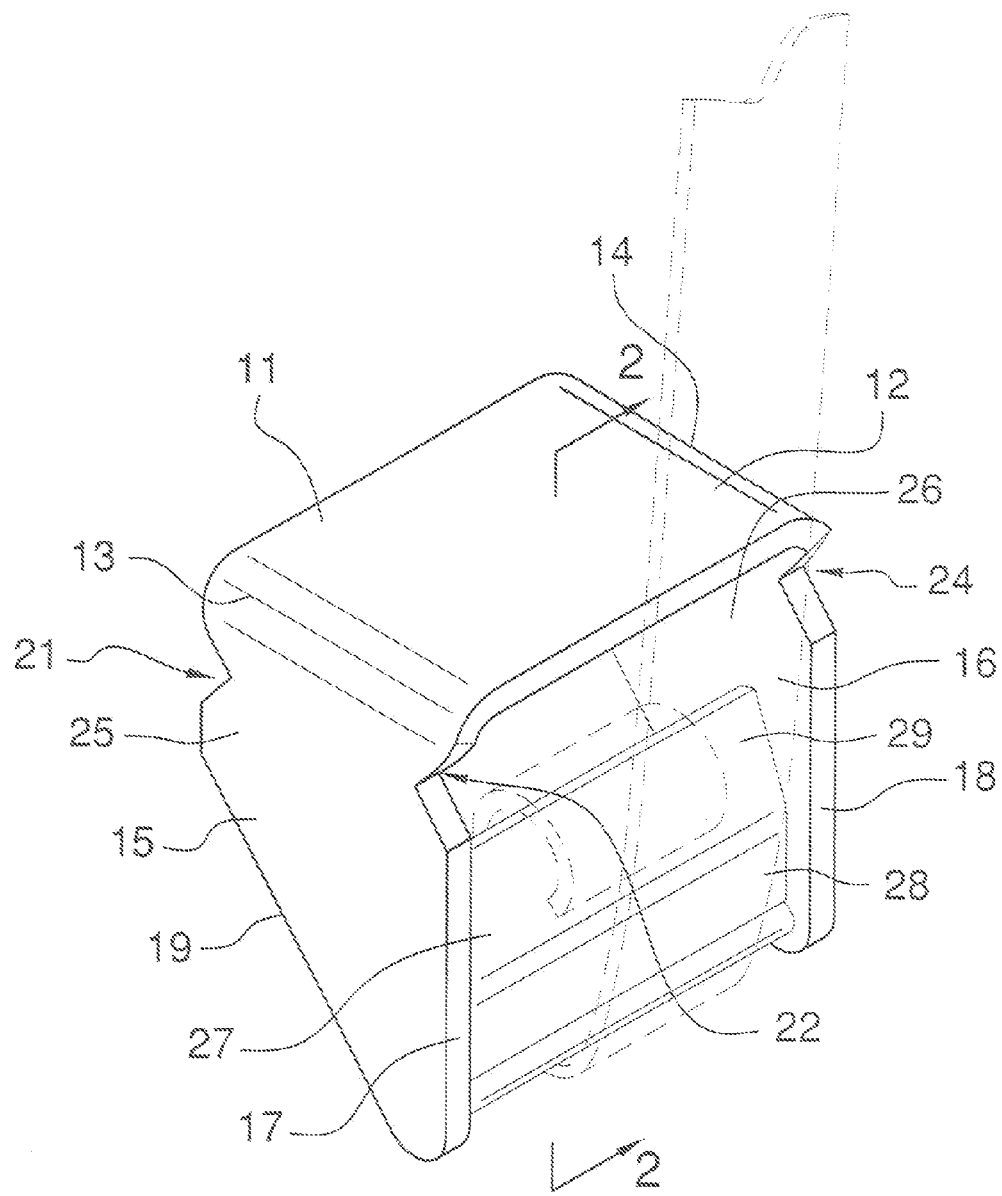
FIG. 1 is a top perspective view of the bracket itself.
Figure 2:
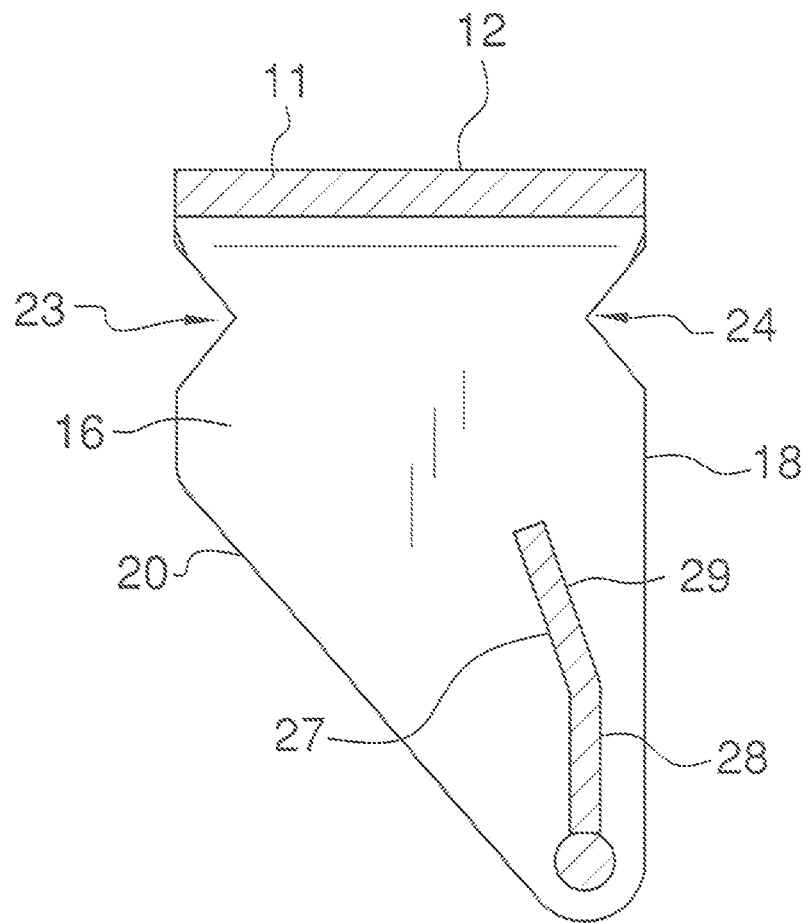
FIG. 2 is a side cross-sectional view of the bracket itself.

With reference now to the drawings, and in particular to FIGS. 1 through 4 thereof, a new movable strap securement system embodying the principles and concepts of the present invention and generally designated by the reference numeral 10 will be described.

As best illustrated in FIGS. 1 through 4, the movable strap securement system 10 may generally comprise a bracket 11 preferably made of suitable rigid material and adapted to be movable along a transport 44 such as a trailer and having a strap securement member 27 for securing a hook 46 attached to an end of a strap 45. The bracket 11 has a top wall 12 and side walls 15-16 spaced apart and integrally depending from opposed side edges 13-14 of the top wall 12, and also has an open front and an open back.

The strap securement member 27 may be disposed between and securely and conventionally attached to inner sides of the side walls 15-16 which face each other. The strap securement member 27 has a bottom 31 which is securely and conventionally attached to the inner sides of the side walls 15-16 and is rounded or bowed outwardly along an edge thereof to prevent tearing or severing the strap when hooked to the strap securement member 27. The strap securement member 27 also has a bottom portion 28 and a top portion 29 which is angled relative to the bottom portion 28 to facilitate latching the hook 46 to the top portion 29. The strap securement member 27 further has a top 30 which is spaced from the top wall 12 of the bracket 11 to allow the insertion of the hook 46 through the open back and over the strap securement member 27. The top and bottom portions 28-29 of the strap securement member 27 may each be planar. The bracket 11 may also include slots 21-24 disposed in front and back edges 17-20 of the side walls 15-16 near the top wall 12. Each of the slots 21-24 may be wedge-shaped. Each of the side walls 15-16 is tapered inwardly from an intermediate portion 25-26 below the slot 21-24 to a bottom of the side wall 15-16 along the back edge 19-20 with the back edge 19-20 intersecting the front edge 17-18 at the bottom to facilitate accessing the strap securement member 27 for latching the hook 46 of the strap 45 to the strap securement member 27.

Figure 3:
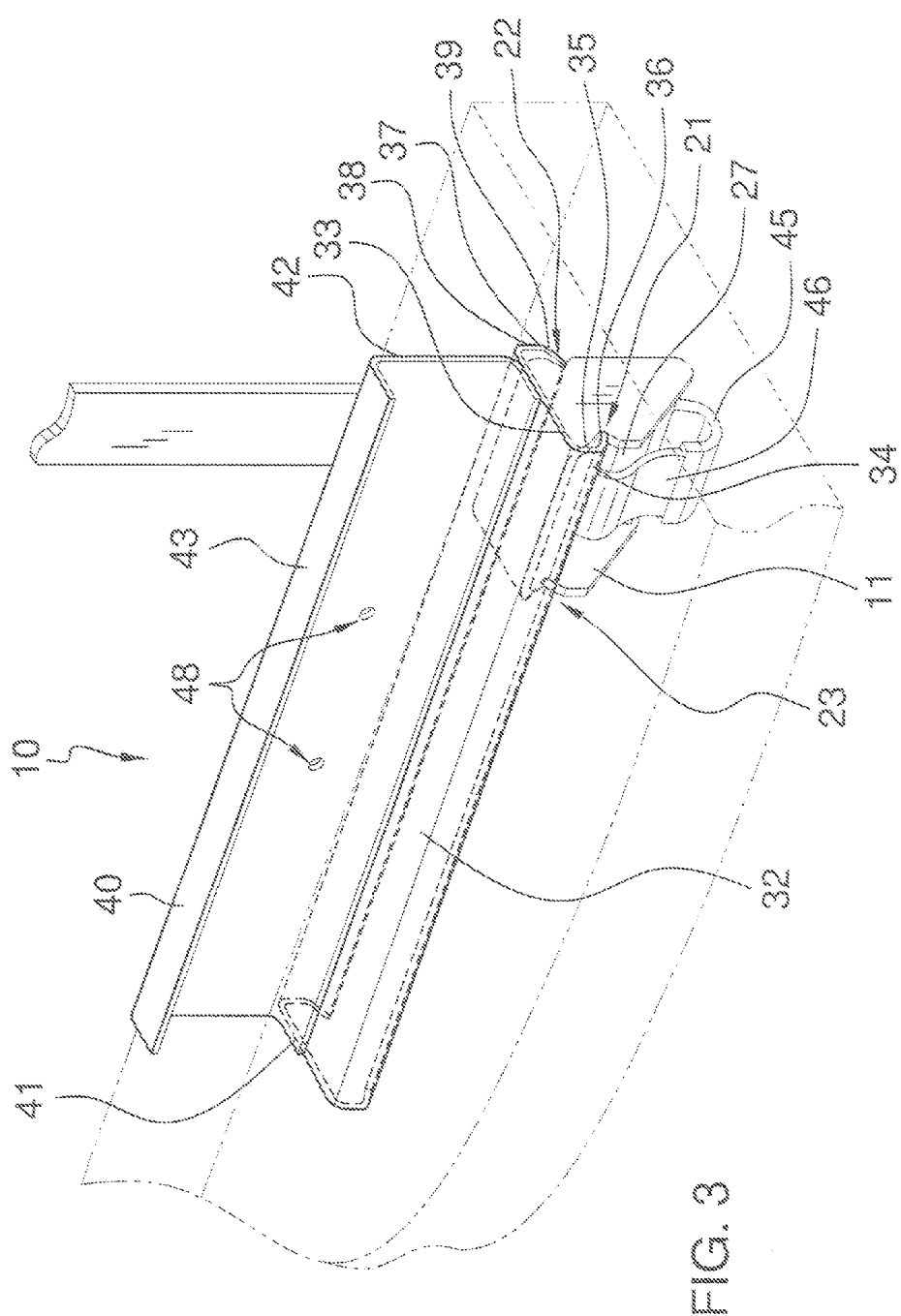
FIG. 3 is a back perspective view of the bracket and the rail.

As shown in FIGS. 3 & 4, the movable strap securement system 10 may also include a rail 32 preferably made of a rigid material and adapted to extend along a side of the transport 44 and having a top wall 33 and flanges 34 & 37 extending along and integrally depending from opposed side edges of the top wall 33 to form a channel 47 between the flanges 34 & 37 and the top wall of the rail 32. The bracket 11 may be slidably received in the channel 47 and shrouded by the top wall 33 and flanges 34 & 37 of the rail 32. The bracket 11 is supported by the rail 32 with the flanges 34 & 37 received in the slots 21-24 of the bracket 11 to support the bracket 11. Each flange 34 & 37 has a top portion 35 & 38 integrally depending from the top wall 33 and a bottom portion 36 & 39 angled relative to the top portion 35 & 38 and inwardly of the rail 32 and toward each other. The bottom portions 36 & 39 of the flanges 34 & 37 are received in the slots 21-24 with one flange 34 being received in the slots 23-24 in the back edges 19-20 of the side walls 15-16 of the bracket 11 and with the other flange 37 being received in the slots 21-22 in the front edges 17-18 of the side walls 15-16 of the bracket 11.

As shown in FIGS. 3 & 4, the movable strap securement system 10 may further comprise a rail support member 40 preferably made of a rigid material and adapted to extend along and be fastened with fasteners to the transport 44 and having a bottom segment 41 securely and conventionally attached to the outer surface of the top wall 33 of the rail 32 and also having an intermediate segment 42 integrally attached to a side edge of the bottom segment 41. The intermediate segment 42 has a length and width and has holes 48 disposed therethrough for receiving fasteners to fasten the rail support member 40 to the transport 44. The intermediate segment 42 of the rail support member 40 is generally perpendicular to the bottom segment 41 and extends upwardly from the bottom segment 41. The intermediate segment 42 may be planar. The rail support member 40 also includes a top segment 43 integrally attached to a top of the intermediate segment 42 and disposed perpendicular to the intermediate segment 42 and parallel to the bottom segment 41 and also extending in the same direction as the bottom segment 41 to essentially form a C shape.

In use, the strap 45 is optimally positioned over the cargo carried on the transport 44 to ensure maximum safety. The strap 45 is positioned to immobilize the cargo. The bracket 11 is moved upon the rail 32 and the bracket 11 is aligned with the strap 45 which is draped transversely upon the transport 44 and the cargo. The strap 45 is then secured to the bracket 11I to tie down the cargo upon the transport 44. The hook 46 is latched to the strap securement member 27 with the strap 45 being tightly secured about the cargo and with the hook 46 being securely hooked upon the top portion 29 of the strap securement member 27.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the movable strap securement system. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A movable strap securement system comprising:
a bracket adapted to be movable along a transport and having a strap securement member for securing a hook attached to an end of a strap, wherein the bracket also has a top wall and includes slots disposed in front and back edges of side walls near the top wall of the bracket,
a rail adapted to extend along a side of the transport and having a top wall, wherein the bracket is slidable upon and supported by the rail; and
a rail support member adapted to extend along and be fastened to the transport and having a bottom segment securely attached to the top wall of the rail and also having an intermediate segment integrally attached to a side edge of the bottom segment; wherein the intermediate segment has holes disposed therethrough for receiving fasteners to fasten the rail support member to the transport.

2. The movable strap securement system as described in claim 1, wherein the intermediate segment of the rail support member is generally perpendicular to the bottom segment and extends upwardly from the bottom segment; wherein the intermediate segment is planar.

3. The movable strap securement system as described in claim 1, wherein the rail support member also includes a top segment integrally attached to a top of the intermediate segment and disposed perpendicular to the intermediate segment and parallel to the bottom segment and extending in a same direction as the bottom segment.

* * * * *